United States Patent
Hubbard

[15] 3,661,464
[45] May 9, 1972

[54] OPTICAL INTERFEROMETER
[72] Inventor: Charles J. Hubbard, Huntington, N.Y.
[73] Assignee: Jorway Corporation, Westbury, N.Y.
[22] Filed: Mar. 16, 1970
[21] Appl. No.: 19,632

[52] U.S. Cl.................................................356/106, 235/92
[51] Int. Cl.........................................H01s 9/02, G06f 7/38
[58] Field of Search.........................................356/106–113; 235/92

[56] References Cited

UNITED STATES PATENTS 2,571,937    10/1951    Peck..................................356/106 X

OTHER PUBLICATIONS

" Wavelength or Length Measurement by Reversible Fringe Counting" JOSA Vol. 43, No. 6, pp. 505– 509, Peck et al.

Primary Examiner—Ronald L. Wibert
Assistant Examiner—Conrad Clark
Attorney—Hubbell, Cohen & Stiefel

[57] ABSTRACT

An optical interferometer of the coherent light type with which distances are measured by counting the total number of interference fringes produced when one reflector of a pair in the interferometer is moved through the distance to be measured. The movable reflector which is also translatable normal to the direction of measurement, is a roof prism having its reflective surfaces elongated in this direction. Photoelectric detectors are provided on opposite sides of a beam splitter for each providing a pair of phase displaced sinusoidal interference signals. The outputs of the detectors are combined to produce a single pair of phase displaced sinusoidal interference signals having an average D.C. level of zero volts. Electronic logic circuitry is provided for producing a digital signal representing the amount and direction of the displacement of the movable reflector along the axis of measurement. This circuitry includes a weighted summing means, including an operational amplifier, for providing at least one sinusoidal signal pair from the combined detector outputs, which is a weighted sum of these outputs and which is squared by Schmitt triggers and combined with these outputs in accordance with a predetermined signal pair condition.

35 Claims, 11 Drawing Figures

INVENTOR
CHARLES J. HUBBARD
BY
ATTORNEYS.

OPTICAL INTERFEROMETER

BACKGROUND OF THE INVENTION

1. Field of the Invention

The present invention relates to an optical interferometer and more particularly relates to a high resolution optical interferometer which is operable in the presence of reflector displacement normal to the direction of measurement.

2. Description of the Prior Art

Optical interferometers are well known. The operation of such an optical interferometer is as follows. A beam of light of a given frequency is incident on a partially reflecting mirror that splits the beam into two separate beams that proceed along different paths. Each path is terminated by a reflector, which returns the light to the beam splitter, where they are recombined. The intensity of the resultant light depends on the relative phase of the recombining beams which is determined by the difference in the optical paths traversed by the separate beams from point of separation to point of recombination. These interferometers rely on a fixed relationship between the change in optical path in terms of wave length and the corresponding phase change. Normally a change in optical path of one wave length corresponds to a phase change of 360°. As either reflector moves relative to the other, the intensity of the combined beam undergoes sinusoidal changes, One full cycle represents a reflector displacement with respect to a reference point of one-half a wave length due to reflection. That is, the path length traversed by the beam is twice the displacement. These intensity fluctuations, are electronically detected and counted so as to provide a measurement of the displacement of one of the reflectors with respect to the other. One reflector, which is termed the reference reflector, is maintained at a fixed distance from the beam splitter so that the instantaneous position of the other movable reflector may be obtained. Optical interferometers capable of measuring relatively long distances have utilized monochromatic coherent light sources, such as gas lasers. A problem which is present in the use of laser interferometers is that of disturbances in operation of the laser light source due to light that returns to the source from the reflector elements of the interferometer. If a substantial part of the transmitted light returns to the laser, fluctuations in the light output occur which introduce errors in the fringe count. Retroreflectors which displace the reflected wave a sufficient distance so that it will not return to the laser source but which maintain it parallel to the incident wave have been utilized in place of conventionally used planar mirrors in an attempt to overcome this problem.

The rotational alignment of the retroreflectors, is not critical to the production of parallel beams, which result in fringe generation and, therefore, their rotational position is not critical as it is when planar mirrors are utilized. However, retroreflectors cannot be translated in a direction normal to the light path between the reflector and the beam splitter. If such translation occurs, the interferometer will not operate properly. If we define the potential directions of movement of the reflector with respect to three normal axes, $x$, $y$ and $z$, with $z$ being the axis of view, as pitch, which is rotation fore and aft about axis $x$; yaw, which is rotation left and right about axis $y$; roll, which is rotation about the axis of view, axis $z$; and translation as movement along an axis, we can describe the critical alignments necessary for various types of conventional reflectors. A planar mirror can only be translated or rolled but may not be appreciably subject to pitch or yaw. A retroreflector can be subject to pitch or yaw, but may not be subject to roll or lateral translation. In optical interferometers, such as a dual axis interferometer, or a single axis interferometer wherein lateral displacement of the reflector may occur due to lateral adjustment with respect to the plane of measurement, the most desirable features are that the reflector be laterally translatable with respect to its associated optical path, as well as having freedom of movement at least with respect to pitch, which is a parameter whose precise control could result in problems in manufacture and use of the device.

It is well known in laser interferometers to utilize light beams which are plane polarized at right angles to each other, and which may be discriminated from each other by polarization sensing means. To accomplish this polarization discrimination, means such as a Wollatson prism, which deflects the differently polarized components to separate photocells, have been utilized. In this manner, two phase displaced sinusoidal signals, such as representing sine and cosine of a given phase angle, are produced. This pair of sinusoids is utilized to provide a digital signal which is fed through logic circuitry to a reversible counter to indicate the length of movement of the movable reflector from a given reference point irrespective of direction of movement. These prior art interferometer systems, however, do not provide a high resolution from these sinusoidal signals to provide the accuracy which is necessary in precise critical measurements, such as where the measurement interval is in microinches. An error of 3 or 4 microinches would be critical where the interferometer was utilized to control an instrument whose location was critical, such as in a step and repeat camera used in integrated circuit mask fabrication. The resolution of these conventional interferometers is limited to quarter cycles of the sinusoidal interference signals which are produced, which is equivalent to some proportional multiple of an associated wave length. However, these devices are not capable of resolving smaller fractional multiples of these cycles.

The electronic circuitry associated with conventional interferometers has utilized Schmitt trigger circuits to square the sinusoidal signals and provide digital signals related thereto. In order to maintain an accurate relationship between the digital signal and the sinusoid, it is desirable to have the sinusoid symmetrical about a D.C. level of 0 volts. The reason for this is that in this manner the Schmitt trigger circuits will trigger at the appropriate time to provide a 50 percent duty cycle for the resultant square waves, which will be independent of laser intensity. However, a problem results in maintaining an accurate relationship of the digital signal to the sinusoid because the average D.C. level of the produced sinusoidal interference signal is not normally 0 volts, due to such factors as the diode nature of a photocell, and elaborate means must be utilized to compensate for this deviation.

SUMMARY OF THE INVENTION

An optical interferometer is constructed of the type with which distances are measured by counting the total number of interference fringes produced when one of the elements of the interferometer is moved through the distance to be measured. The interferometer includes a source of coherent light beams, such as a laser. The optical system of the interferometer includes a first reflector, a means for dividing the light beam into two parts that are directed along separate paths, one of which intersects the first reflector which is oriented with respect to the dividing means to redirect the intersecting part from the dividing means for recombination with the other part in an interference field, and a second reflector, the other of the paths intersecting the second reflector which is translatable with respect to the dividing means normal to the light path therebetween. The second reflector has two reflective surfaces normal to each other which are elongated in the direction of translation normal to the respective light path. This second reflector is oriented with respect to the dividing means to redirect the other of the parts from the dividing means for recombination with the first part in the interference field. One of the reflectors is translatable with respect to the dividing means along the light path therebetween. The dividing means provides interference fields along separate paths from the recombined beams which are converted into corresponding sinusoidal electrical interference signals by photoelectric detectors, which are also included. Each detector provides a pair of phase displaced sinusoidal signals. The outputs of the detectors are combined to produce a single pair of phase displaced sinusoidal interference signals having an average D.C. level of 0 volts.

In addition, means are included for determining the amount of translation of the one reflector along the respective light path from the cyclic variations in the net intensity of light at a point in the interference field which are solely due to the translation of the reflector as represented by the sinusoidal electrical interference signals. This means includes a weighted summing means such as an operational amplifier network, which provides another pair of sinusoidal signals from the first pair which is a weighted sum of the first signal pair. A direction sensing means is also included which provides a digital signal related to the amount and direction of translation of the one reflector along the light path from the first and second signal pairs in accordance with a predetermined signal pair condition.

DETAILED DESCRIPTION OF THE PREFERRED EMBODIMENT

Figures 1, 7:
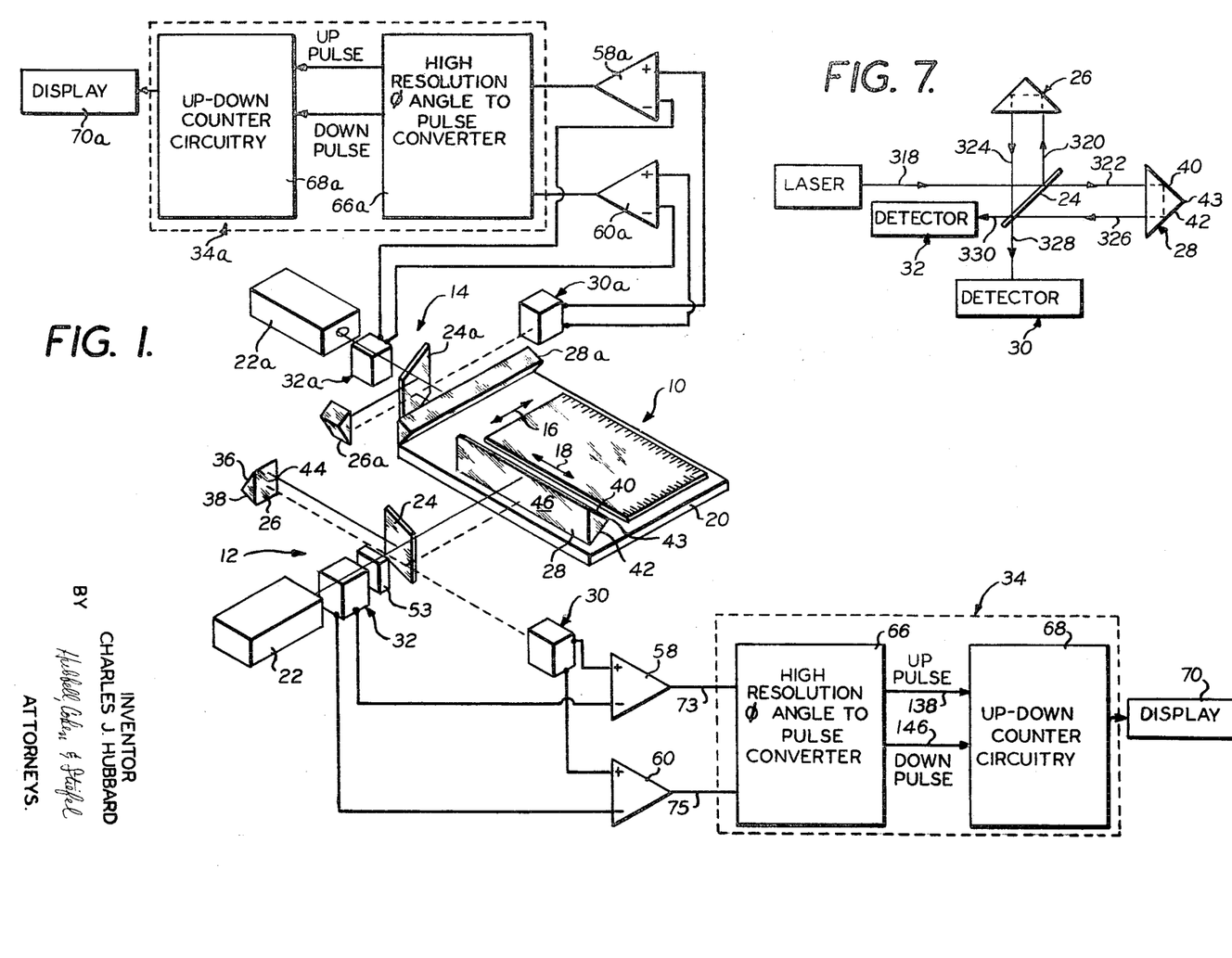
FIG. 1 is a perspective view, partially in schematic and partially in block, of an interferometer in accordance with the preferred embodiment of the invention.
FIG. 7 is a diagrammatic view of a part of the apparatus shown in FIG. 1.

Referring now to the drawings in detail, FIG. 1 shows a dual axis measuring system, generally referred to by the reference numeral 10, which utilizes two identical optical interferometers 12 and 14 constructed in accordance with the preferred embodiment of the present invention. Each of the interferometers 12 and 14 is utilized for measurement of translation along a separate axis of the dual axis system 10. The interferometer generally referred to by the reference numeral 12 is utilized for measurement of translation in the reversible direction of arrow 16, and the interferometer generally referred to by the reference numeral 14 is utilized for measurement of translation in the reversible direction indicated by arrow 18. For purposes of illustration, the dual axis interferometer 10 includes a moveable platform 20 translatable in the directions indicated by the arrows 16 and 18, which are preferably normal to each other, and whose translation along an axis is measurable. The platform 20, which does not form part of the present invention, could be translated by any conventional means, such as an adjustable screw mechanism, not shown.

The preferred embodiment of the present invention will be described with reference to optical interferometer 12, which is identical in structure and principles of operation to optical interferometer 14, the identical components of interferometer 14 being designated by the same reference numeral as used in the description of interferometer 12, followed by a subscript a.

The optical interferometer 12 of the present invention includes a light source 22, which is preferably a coherent monochromatic light source, such as a polarized laser; a light dividing element, or beam splitter 24; and a pair of reflecting roof prisms 26 and 28, disposed about the beam splitter 24. The beam splitter 24, and reflecting roof prisms 26 and 28 comprise the optical system of the interferometer 12.

REFLECTORS

For purposes of measurement, one of the reflectors, which is preferably a roof prism 26, is maintained fixed relative to the dividing element 24 while the other reflector, which, in accordance with one feature of the present invention, is also a roof prism 28, is secured in some manner to the platform 20, and is, therefore, translatable along the axis of measurement with respect to the beam splitter 24. The roof prisms 26 and 28, include reflective surfaces 36 and 38, and 40 and 42, respectively, which are normal to each other, and front surfaces 44 and 46, respectively. The respective front surfaces 44 and 46 of the roof prisms 26 and 28 preferably form an angle of 45° at the point of intersection with the associated reflective surfaces 36 and 38, and 40 and 42. Preferably, the surfaces of the prisms 26 and 28 are planar. The reflective surfaces 40 and 42, as well as the front surface 46 of the roof prism 28 which is reversibly translatable along the measurement axis in the direction of arrow 16, are preferably elongated in the direction normal to the direction of measurement, which is the direction indicated by the arrow 18. The roof prisms 28 and 28a are preferably both of a length at least equal to the total normal displacement of platform 20 so that translation of the roof prism 28 in the direction 18, which is normal, to the direction of measurement 16, will not interfere with the measurement in the direction indicated by the arrow 16, as lateral translation of the roof prism 28 normal to the direction of incidence will not affect the path of reflection therefrom. The same is true for roof prism 28a in translation in the direction 16. This result cannot be achieved by any other form of reflector heretofore used which also provides for beam displacement. Furthermore, if desired, roof prisms 26 and 26a could also be elongated in the direction normal to the incident light path so as to allow lateral translation in this direction. Preferably, the roof prism 28 should be oriented so that the roof line 43, which is the point of intersection of the two normal reflecting surfaces 40 and 42, causes the roof prism to reflect a parallel beam along the axis of measurement. As can be seen by reference to FIG. 7, with respect to the moveable reflector 28, it is preferably oriented so that the parallel reflected beam is displaced so as not to be reflected back into the laser source 22. It is to be noted that in FIG. 7 roof prism 26, beam splitter 24 and detector 30 have been rotated 90° with respect to their normal position in FIG. 1 for purposes of clarity. Once the location of the roof line 43 with respect to the laser source 22 is established the prism can be considerably pitched, with respect to the beam splitter 24, and laterally translated normal to the direction of measurement, without affecting the location of the reflected beam with respect to the incident beam, and, hence, without affecting the operation of the interferometer 12.

DETECTION AND CORRECTION CIRCUITRY

Eelectronic detection circuitry, generally referred to by the reference numerals 30 and 32 is also disposed about the beam splitter 24, preferably on opposite sides thereof from the respective roof prisms 26 and 28. The roof prisms 26 and 28, and the respective detectors 30 and 32, are oriented with respect to each other and beam splitter 24 so that the reflected light beams from the prisms 26 and 28 return to the beam splitter 24 and in turn strike the detectors 30 and 32, in a manner to be described in greater detail hereinafter. The detectors 30 and 32 preferably include photoelectric detectors 55 and 57 which convert the optical signals into equivalent electrical signals. These detectors 30 and 32 are operatively connected through associated circuitry, generally referred to by the reference numeral 34, for determining from these electrical signals, in a manner to be described in greater detail hereinafter, the amount and direction of translation of the platform 20 along the axis of measurement, which in the case of interferometer 12 is indicated by the arrow 16.

Preferably, the detectors 30 and 32 are identical so as to have equal amounts of D.C. leakage, which is dependent on temperature, associated therewith, which may be cancelled in a manner to be described in greater detail hereinafter. The electrical signals produced by detectors 30 and 32 are identical, the only difference being in the phase of the detected signals which are preferably cyclical signals of the sinusoidal variety, and the relative average D.C. signal levels associated therewith. As can be seen by the reference to FIGS. 6A and 6B, wherein the curve 48 represents the sinusoidal signal associated with detection circuit 30 and curve 50 represents the sinusoidal signal associated with detection circuit 32, the relative phase relationship of the signals 48 and 50 is approximately 180°. The average D.C. level of these signals is indicated by the lines 52 and 54, respectively. The relative location 49 of this average D.C. level with respect to the respective signal peak values is identical. However, due to inaccuracies in the beam splitter 24, as well as D.C. leakage of the photocells 55 and 57, the relative displacement 51 of the sinusoidal signal 50 and its corresponding average D.C. level 54, with respect to the reference zero voltage level may be slightly different from that associated with detector 30. In order to compensate for this variation from the ideal case, preferably, a neutral density filter 53 is inserted between the detection circuitry 32 and the beam splitter 24 to attenuate the optical signal before it strikes the detection circuitry 32 so that the relative displacement of the sinusoidal signals 48 and 50 and their respective D.C. levels 52 and 54 with respect to 0 volts is equal. Of course, if these displacements are normally equal, the attenuation means, or neutral density filter 53, may be omitted.

Figures 2, 6A, 6B:
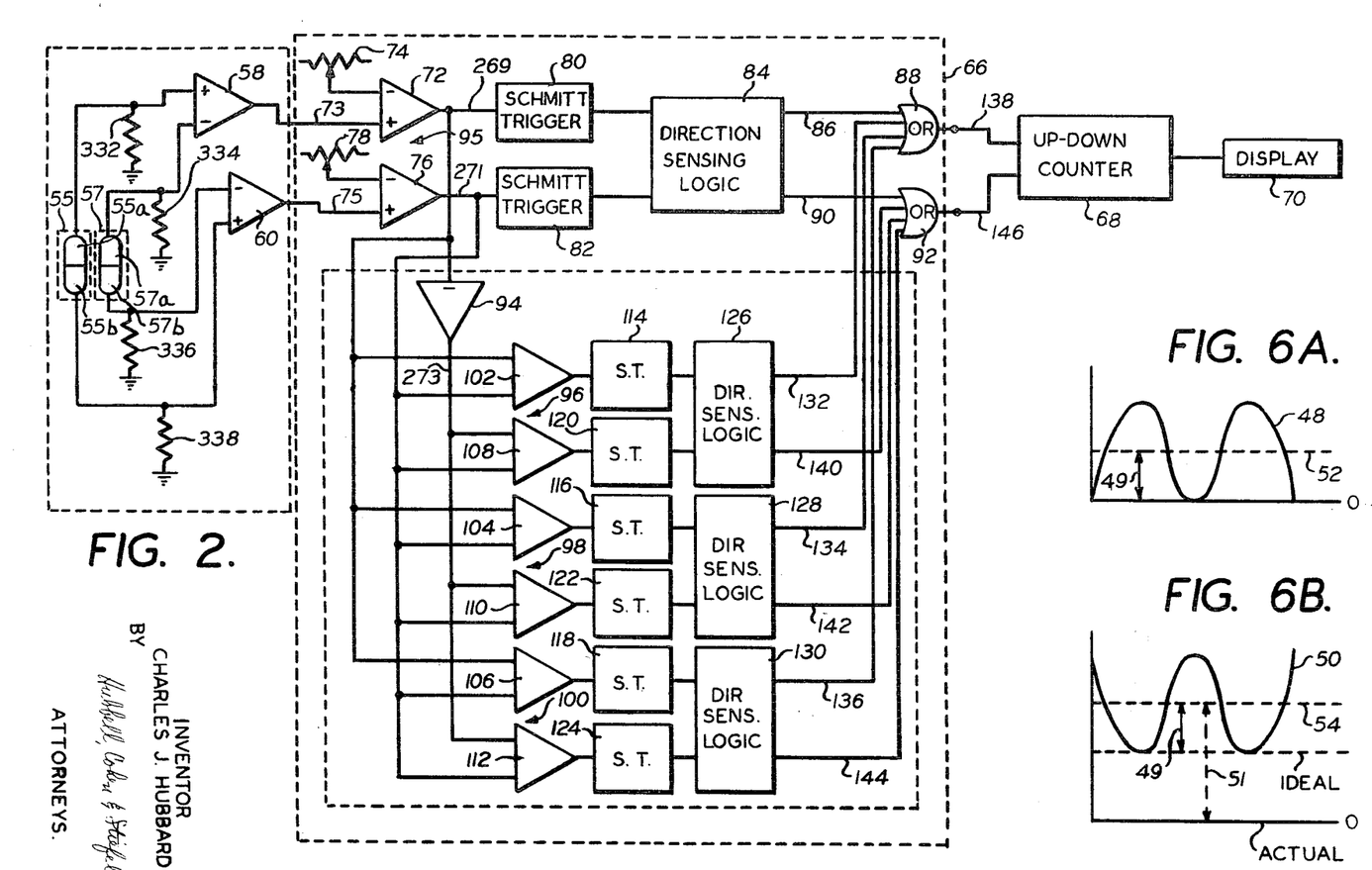
FIG. 2 is a diagram, partially in block and partially in schematic of the electronic circuitry of FIG. 1.
FIGS. 6A and 6B are graphical illustrations of a portion of the signals associated with the operation of the embodiment shown in FIG. 1.

The photoelectric detectors 55 and 57 associated with electronic detection circuitry 30 and 32 respectively, are preferably each two-element photocells 55 and 57, which are illustratively shown in FIG. 2. If desired, these two-element photocells could each be replaced by two single element photocells. Furthermore, if means, not shown, are provided for directing all the returning beams to the same side of the beam splitter 24, both two-element photocells could be replaced by a single four-element photocell. A conventional means, not shown, such as a Wollatson prism, is provided for separating the polarized laser beam into vertical and horizontal components. This separation prism co-operates with the respective two-element photocells 55 and 57 to direct the vertical and horizontal polarization components of the laser beam to the appropriate elements of the photocells 55 and 57. The electronic detection circuitry 30 includes conventional associated circuitry for converting the optical signals incident on the respective elements of the photocells 55 and 57 into cyclically varying sinusoidal signals. In addition to this associated circuitry (FIG. 2), a difference amplifier 58, or subtractor, is associated with elements 55a and 57a of the respective two-element photocells 55 and 57, and another difference amplifier 60, or subtractor, is associated with the other elements 55b and 57b of the respective two-element photocells 55 and 57. The operation of these two-element photocells 55 and 57 will be described in greater detail hereinafter.

As was previously mentioned, the output of detectors 30 and 32 are identical sinusoidal signals having associated average D.C. levels 52 and 54 which are adjusted to be equal. The respective outputs of amplifiers 58 and 60, along paths 73 and 75, respectively, are sinusoidal signals which are preferably phase displaced from each other at a phase angle of 90° and, therefore, may be represented by the sinusoidal functions $\sin \theta$ and $\cos \theta$; and which for all intents and purposes, have an average D.C. level of 0 volts, for a purpose to be described in greater detail hereinafter. Of course, it would be obvious to one skilled in the art that if the average D.C. level of the phase displaced sinusoids which are produced by one of the detectors, for example, detector 30, is already 0 volts then the other detector 32 and the associated subtractor circuits 58 and 60 could be eliminated and the phase displaced sinusoids fed directly from the detector 30 to the associated electronic measurement determination circuitry 34 which provides a high resolution output of the displacement of roof prism 28, and hence, platform 20, along the axis of measurement from these sinusoidal signals, in a manner to be described in greater detail hereinafter.

ELECTRONIC MEASUREMENT DETERMINATION CIRCUITRY

The electronic measurement determination circuitry 34 includes a high resolution phase angle to pulse converter 66 and conventional means, such as a reversible up-down counter 68 and associated circuitry, for converting the information pulses produced by the high resolution phase angle to pulse converter 66 into a count corresponding to the length of translation of the platform 20 along the measurement axis 16. A conventional display device 70 could be utilized with the reversible up-down counter circuitry 68 to provide a display of this information. Furthermore, if desired, a pulse rate multiplier, not shown, could be included in the up-down counter circuitry 68 to vary the pulse rate being input into the counter 68.

A block diagram of the high resolution phase angle to pulse converter 66 is shown in FIG. 2. The converter 66 includes a conventional amplifier 72 and a corresponding D.C. level adjust variable resistance 74 whose primary purpose is to insure an average D.C. level of 0 volts, which may be omitted if the subtractor circuit 58 output signal deviation from this value is an acceptable level for the $\sin \theta$ output detection circuitry 30 and 32, and another similar amplifier 76, and D.C. adjust variable resistor 78 which could also be eliminated if the subtractor circuit 60 output signal deviation from the 0 volt average D.C. level is an acceptable level for the phase displaced $\cos \theta$ output of the detection circuitry 30 and 32. The $\sin \theta$ output of amplifier 72 and the $\cos \theta$ output of amplifier 76 are respectively connected to squaring circuits 80 and 82, which are preferably conventional Schmitt trigger circuits, by signal paths 269 and 271, respectively. Direction sensing logic circuitry 84 is provided for converting the squared pair of sinusoids, $\sin \theta$ and $\cos \theta$, into up or down pulses which correspond to the amount and direction of the movement of the platform 20 along the measurement axis 16, in a manner to be described in greater detail hereinafter. The up pulses are arbitrarily chosen as corresponding to displacement away from beam splitter 24, while the down pulses are arbitrarily chosen as corresponding to displacement toward beam splitter 24. Clearly, if the opposite choices were made, the system would work. The up pulses are directed over path 86 to a conventional combining means, such as an OR Gate 88. The down pulses are preferably directed along a separate path 90, although if desired they could be directed along the same path, to a separate combining means, such as another OR Gate 92. The operation of these circuits will be described in greater detail hereinafter.

Preferably, the converter 66 also includes an inverter 94, capable of producing an output which is the complement of the input thereto. The inverter 94 is connected in parallel to the $\sin \theta$ output of amplifier 72 to provide, an an output along a path 273, a sinusoidal signal represented by $-\sin \theta$, for a purpose to be described in greater detail hereinafter. Preferably, the inverter 94 (FIG. 3B) is a conventional operational amplifier inverter circuit which includes an operational amplifier 310, stabilizing capacitors 312 and 314, and a voltage limiter 316 in addition to other conventional associated circuitry which will not be described in greater detail as it will be understood by one of ordinary skill in the art.

In order to provide a high resolution for the converter 66, as will be described in greater detail hereinafter, the converter 66 includes a plurality of weighted summing devices which are connected so as to provide output signals which are the weighted sums of the $\sin \theta$ and $\cos \theta$ sinusoidal signals which are produced by the detection circuitry 30 and 32 and amplified by the amplifiers 72 and 76, respectively. As may be seen in FIG. 2, the weighted summing devices, which preferably include operational amplifiers, 102, 104, 106, 108, 110 and 112, each provide a sinusoidal output signal which is a weighted sum of both sinusoidal input signals. The weighted summing devices are arranged in pairs, three pairs, 96, 98 and 100 being shown for purposes of illustration. One weighted summing means 102, 104 and 106 of pairs 96, 98 and 100, respectively, is connected in a manner to be described in greater detail hereinafter, to provide a weighted sum of the sin $\theta$ and cos $\theta$ input signals from the detection circuitry 30 and 32, while the other weighted summing device 108, 110 and 112 of pairs 96, 98 and 100, respectively is connected to provide a differently weighted sum of the sin $\theta$ and cos $\theta$ input signals from the detection circuitry 30 and 32.

For purposes of illustration the weighted sums produced by the respective operational amplifiers 102, 104 and 106 of the respective pairs 96, 98 and 100 can be represented by the trigonometric identity sin $(\theta+\phi)$= sin $\theta$ cos $\phi$ + cos $\theta$ sin $\phi$, and the weighted sums produced by the other operational amplifiers 108, 110 and 112 of the respective pairs 96, 98 and 100 can be represented by the trigonometric identity cos $(\theta+\phi)$ = cos $\theta$ cos $\phi$ − sin $\theta$ sin $\phi$, where $\phi$ is an arbitrary predetermined phase angle, and the trigonometric functions cos $\phi$ and sin $\phi$ are weighting constants. The phase angle $\phi$ is preferably chosen to be a different value for each of the pairs 96, 98 and 100 resulting in a different weighted sum of the input sinusoids sin $\theta$ and cos $\theta$ for each signal pair. Preferably for the first pair 96, $\phi$ is 22.5°; for the second pair 98, $\phi$ is 45°; and for the third pair, 100, $\phi$ is 67.5°. By utilizing these phase angles, high resolution up to a 16th of a cycle can be achieved, in a manner to be described in greater detail hereinafter.

The inverter 94 output, −sin $\theta$, along path 273, is connected in parallel as one input to the cos $(\theta+\phi)$ weighted sum device 108, 110 and 112 of the respective pairs 96, 98 and 100, while the cos $\theta$ output of amplifier 76, along path 271, is connected in parallel to a second input of these devices 108, 110 and 112. The sin $\theta$ output of amplifier 72, along path 269, is connected in parallel to one input of the devices 102, 104 and 106 to provide the sin $(\theta+\phi)$ weighted sum. The other input connected to these devices 102, 104 and 106, in parallel, is the cos $\theta$ output of amplifier 76 along path 271. The sin $(\theta+\phi)$ and cos $(\theta+\phi)$ weighted sums are provided from these inputs in a manner to be described in greater detail hereinafter.

The devices 102, 104 and 106 are each connected to a squaring means, which is, preferably, Schmitt triggers 114, 116 and 118, respectively, which are similar to trigger 80, and the devices 108, 110, 112 outputs are preferably connected to a separate squaring means, which are also, preferably, Schmitt triggers 120, 122 and 124 similar to trigger 82. The squared outputs of the respective pairs 96, 98 and 100 are connected to direction sensing logic circuits 126, 128 and 130, respectively, which are similar to circuit 84, to provide up or down pulses dependent on direction of translation along the measurement axis.

The respective direction sensing logic circuits 126, 128 and 130 are associated with the production of an up pulse along paths 132, 134 and 136, respectively. These paths 132, 134 and 136 are connected in parallel to the pulse combining means 88 along with path 86, to provide a digital output signal on path 138, which is constituted by the respective up pulse signals from paths 86, 132, 134 and 136. The direction sensing logic circuitry 126, 128 and 130 for the respective pairs 96, 98, and 100 are associated with the production of a down pulse along paths 140, 142 and 144, respectively. These paths 140, 142 and 144 are connected in parallel to the combining means 92 along with path 90 to provide a digital signal along path 146 which is constituted by the down pulses on paths 90, 140, 142 and 144. The digital signal paths 138 and 146 are connected to the reversible up-down counter circuitry 68.

DETAILED DESCRIPTION HIGH RESOLUTION CONVERTER SCHEMATIC

Figures 3A, 8:
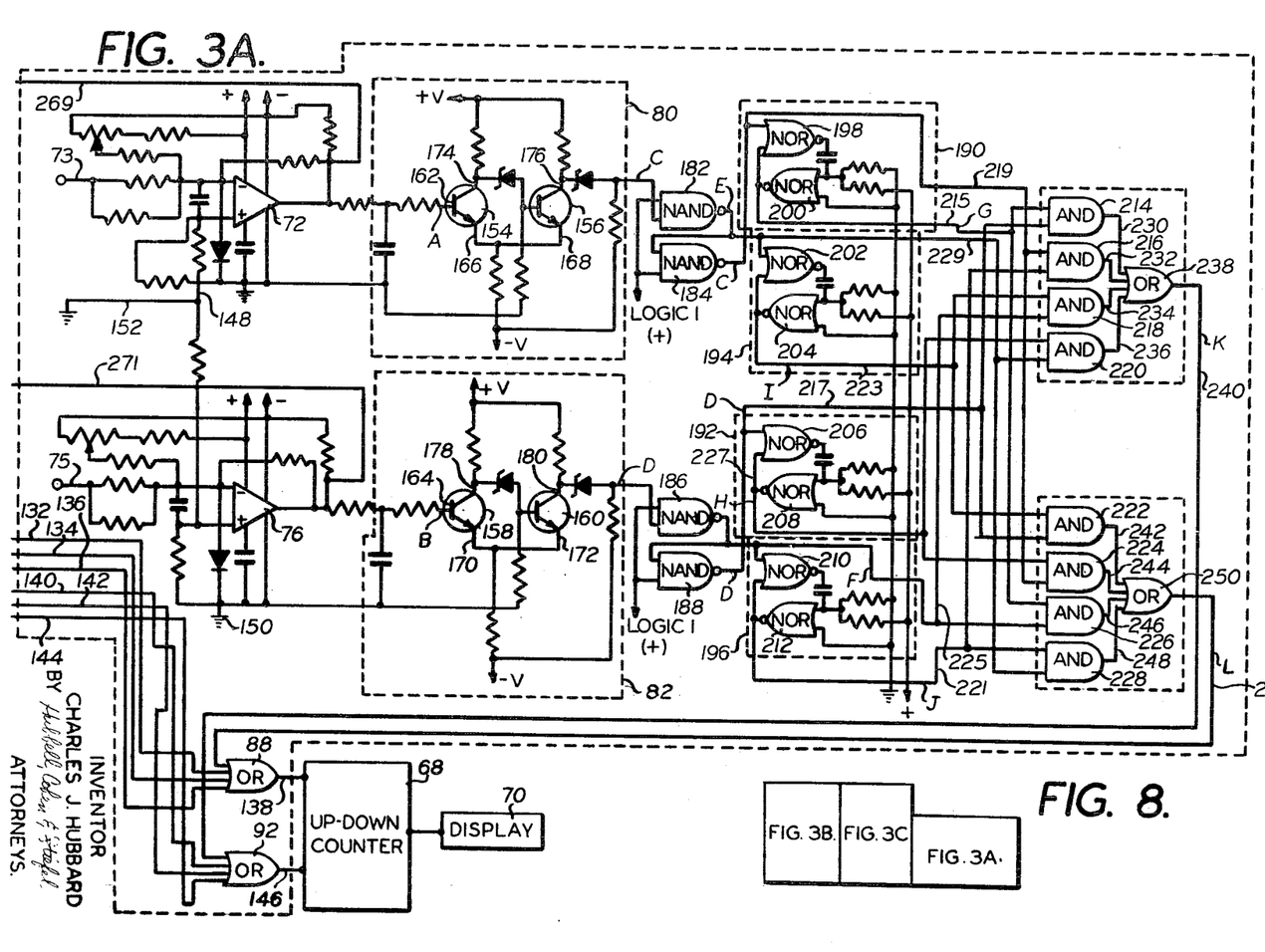
FIGS. 3A, 3B and 3C, when taken together as shown in FIG. 8 is a schematic diagram of a portion of the circuit shown in FIG. 2.
Figure 3B:
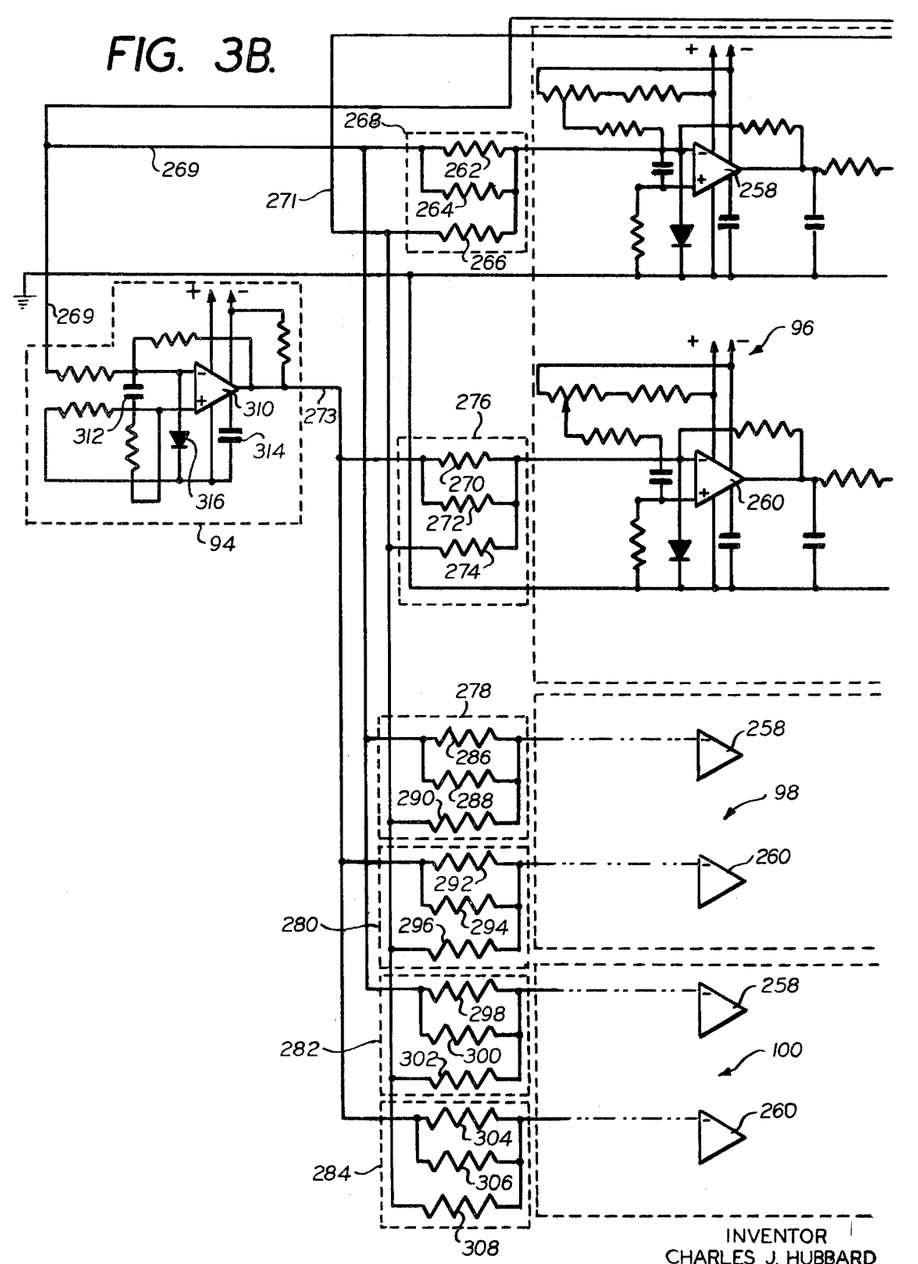
Figure 3C:
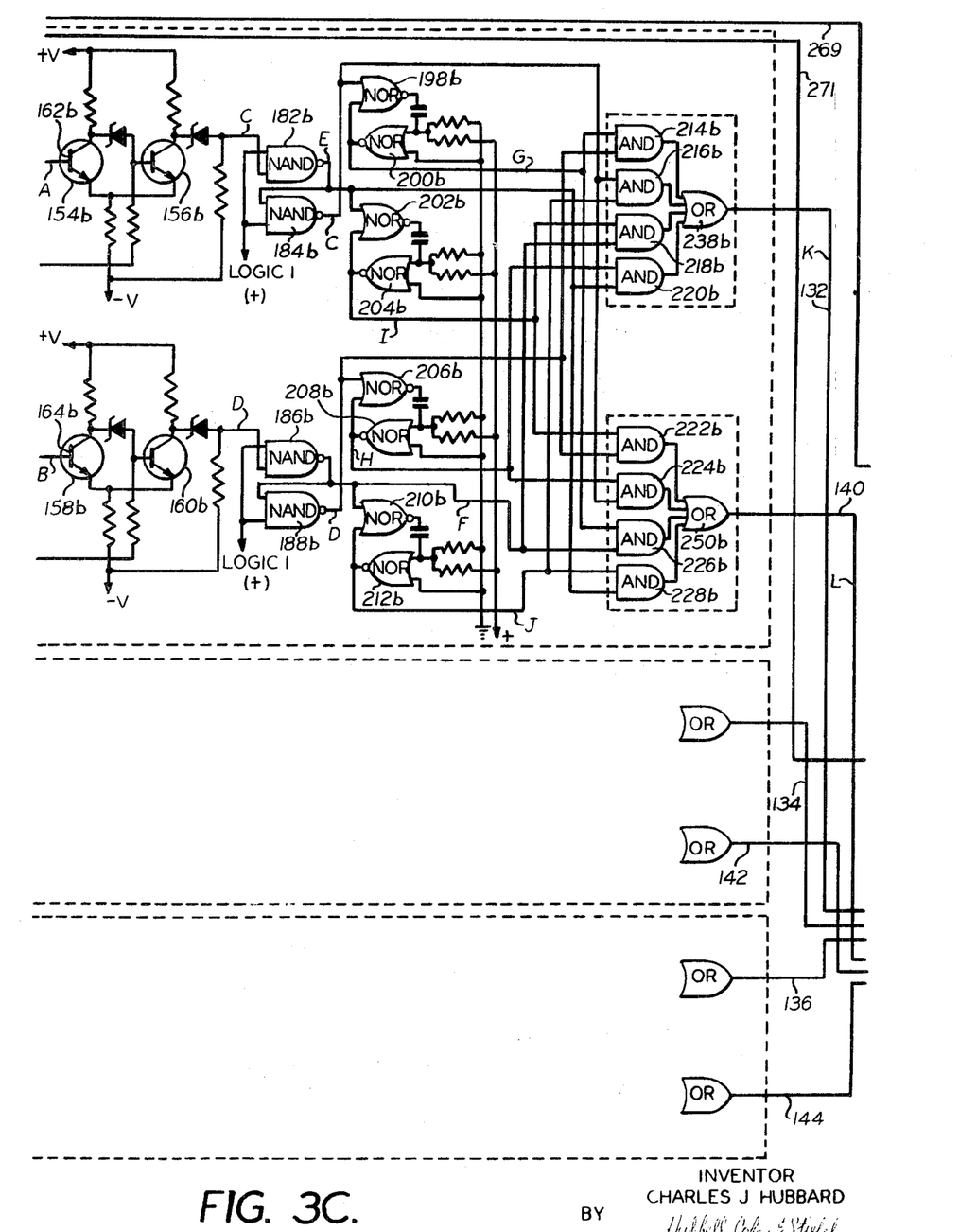

Now referring in detail to the schematic of the high resolution phase angle to pulse converter 66, and particularly to FIGS. 3A, 3B and 3C when taken together as shown in FIG. 8, the schematic details for the signal pairs 90 and 100 have been omitted for purposes of clarity, the circuit configurations being identical to pair 96, the only differences being in the values of the weighting constants determined by the parameters of the respective summing networks 268, 276, 278, 280, 282 and 284. The operation of these circuits in conjunction with the timing diagram illustrated in FIGS. 4 and 5 will be described in greater detail hereinafter. FIG. 3A is substantially a schematic diagram of the sin $\theta$ and cos $\theta$ up-down pulse producing circuits. The amplifiers 72 and 76, as was previously mentioned, are line receiver amplifiers whose purpose is to adjust the D.C. components of the input signals and limit the system noise bandwidth. These circuits 72 and 76 are conventional and are well understood by one of ordinary skill in the art and, therefore, will not be described in detail. Suffice it to say that these amplifiers 72 and 76, preferably, are carefully matched so as not to introduce any differential phase shift. Furthermore, these amplifiers 72 and 76 are preferably operational amplifiers which are each operated in a differential mode, with the non-inverting input, 148 and 150, respectively, connected to the signal ground lead 152. The amplifier circuits 72 and 76, as previously mentioned, are respectively connected to Schmitt trigger circuits 80 and 82, which are conventional D.C.-coupled circuits utilizing an emitter-coupled pair of transistors 154 and 156, and 158 and 160, respectively.

The output of the amplifier circuits 72 and 76 are connected to the base 162 and 164, respectively, of the transistors 154 and 158, respectively, of the emitter-coupled pairs. The emitters 166 and 168, and 170 and 172 of transistors 154 and 156, and 158 and 160, respectively, are coupled to a negative reference, or bias, potential −V, which, by way of example, could be −12 volts, while the collectors 174 and 176, and 178 and 180, of transistors 154 and 156, and 158 and 160, respectively, are coupled to a positive reference, or bias, potential +V, which is, preferably, equal to but opposite in sign to the negative reference potential −V of the emitters 166, 168, 170 and 172. The potentials −V and +V provide the two stable states for the bistable Schmitt triggers 80 and 82, respectively. When transistor 154 is ON the value of the output signal of the Schmitt trigger 80 will be at a value corresponding to logic "1" and, when transistor 154 is OFF, the value of the output of the Schmitt trigger 80 will be at a value corresponding to logic "0." These connections for the Schmitt trigger are conventional and will not be described in greater detail as they will be understood by one of ordinary skill in the art. The operation of this circuit in the high resolution converter 66 will be described in greater detail hereinafter.

The outputs of the respective Schmitt trigger circuits 80 and 82 are, preferably, connected to a pair of serially coupled NAND Gate inverters 182 and 184, and 186 and 188 which are each coupled to a positive voltage which maintains a logic 1 condition present in these NAND Gate inverters 182 and 184, and 186 and 188 for all time, so that these NAND Gates will operate in conjunction with the ON and OFF conditions of triggers 80 and 82. The serial output of the NAND Gate pairs 182 and 184, and 186 and 188, which is present at the output of NAND Gate 184 and 188, respectively, is each connected to a monostable multivibrator, generally referred to by reference numerals 190 and 192, respectively. The serially connected output of NAND Gates 184 and 188, respectively, is in reality a non-inverted output, as it will be apparent to one of skill in the art that the input signal to NAND Gates 182 and 186, respectively, has undergone two inversions, which in reality is equivalent to no inversion at all. The output of NAND Gates 182 and 186, respectively, which is an inverted output, or complement, of the input signal to the respective NAND Gates 182 and 186, is each connected to a second multivibrator 194 and 196, respectively. The multivibrator circuits 190, 192, 194 and 196 are conventional logic circuits which employ a pair of NOR Gates 198 and 200, 202 and 204, 206 and 208, and 210 and 212, respectively, in a conventional boot strap manner, and this conventional circuit will not be described in greater detail as it will be understood by one of ordinary skill in the art. These monostable multivibrators 190, 192, 194 and 196 are of the type which emits a short duration pulse each time the associated Schmitt trigger switches state. This operation will be described in greater detail hereinafter.

Preferably, two groups of four combining means each, which are preferably AND Gates 214, 216, 218 and 220, for one group, which is the up pulse group; and AND Gates 222, 224, 226 and 228 for the other group, which is the down pulse group, are operatively connected to the outputs from multivibrators 190, 192, 194 and 196, so as to each be responsive to a different preestablished logic condition, to be explained in greater detail hereinafter. The output of gate 214 along path 230, of gate 216 along path 232, of gate 218 along path 234, and of gate 220 along path 236 are connected in parallel to a common logic gate 238, which is illustratively shown as an OR Gate, although a NOR Gate, or other logic means, would also be sufficient. The OR Gate 238 is connected to provide an output along path 240 if an output signal is present from any of the gates 214, 216, 218 or 220. The same provisions are true for gates 222, 224, 226 and 228 whose respective outputs along paths 242, 244, 246 and 248 are connected in parallel to a common logic OR Gate 250, which is connected to provide an output along path 252 if an output signal is present from any of the gates 222, 224, 226 or 228.

The preferred logic conditions for the respective AND Gates 214, 216, 218, 220, 222, 224, 226 and 228 result from the circuit connections to be described hereinafter. Each of the AND Gates 214 through 228, inclusive, has two input signals which must be present simultaneously in order for an output signal to be present. Gate 214 has one input connected to the output from monostable 190 along path 215 and which is connected in parallel to gate 226. The other input to gate 214 is connected to the output from NAND Gate 188 along path 217, which is the non-inverted Schmitt trigger output of trigger 82, and which is connected in parallel to gate 222. The inputs to gate 216 are connected, respectively, to the output from NAND Gate 184 along path 219, which is the non-inverted output of Schmitt trigger 80, and which is connected in parallel to gate 224; and to the output of monostable multivibrator 196 along path 221, which is connected in parallel to gate 228. The inputs to gate 218 are connected, respectively, to the output of monostable multivibrator 194 along path 223, which is connected in parallel to gate 222; and to the output of NAND Gate 186 along path 225 which is the complement, or inverted output, of Schmitt trigger 82, which is connected in parallel to NAND Gate 226. The inputs to AND Gate 220 are connected, respectively, to the output of monostable multivibrator 192 along path 227, which is connected in parallel to gate 224; and to the output of NAND Gate 182 along path 229, which is connected in parallel to gate 228. It will become apparent, that from the previous discussion, we have also developed the input connections to AND Gates 222, 224, 226 and 228.

The output of OR Gate 238 is connected to an OR Gate 88 along path 240, and the output of OR Gate 250 is connected to another OR Gate 92 along path 252, although other logic means could be substituted for Gates 88 and 92. As will be explained in greater detail hereinafter, the output of OR Gate 238 represents the occurrence of an up pulse, while the output of OR Gate 250 represents the occurrence of a down pulse. The outputs of the respective OR Gates 88 and 92 are connected to the reversible up-down counter circuitry 68.

Referring now to FIGS. 3B and 3C, the schematic circuit for the Schmitt triggers and direction sensing logic associated with the weighted summing device pair 96 and the circuit connections with respect to the summing networks 268, 276, 278, 280, 282 and 284, and the output connections from the respective OR output gates for each of the signal pairs 96, 98 and 100, is shown. The elements of the circuitry associated with signal pair 96 which are identical to those previously described with reference to signal pair 95 of FIG. 3A, will have the same reference numeral as in the above description, but followed by the subscript b. The basic difference between the circuit for signal pair 96 and the previously described circuit is the addition of appropriate weighted summing devices 102 and 108 each providing an input signal, respectively, to the Schmitt triggers 114 and 120, through base 162b and 164b of transistors 154b and 158b, respectively. Preferably, operational amplifiers 258 and 260, form part of the weighted summing means 102 and 108, respectively, and are identical except for the associated summing network 268 276, respectively, which provide the respective inputs to the operational amplifiers 258 and 260. The values of the impedance parameters 262, 264 and 266 in the weighted sum network 268 associated with operational amplifier 258, and the values of the impedance parameters 270, 272 and 274 in weighted summing network 276 are chosen depending on the particular summing constant desired. As was previously explained, the desired summing constants are $\sin \phi$ and $\cos \phi$, and these parameters are chosen so as to have these trigonometric values occur as the weighting constants for each given value of the arbitrary phase angle $\phi$. For the illustrative example given, these values are chosen so that for pair 96 $\sin \phi$ equals the sine of 22.5° which is approximately 0.9239. The $\sin \theta$ output from amplifier 72 is connected along path 269 to resistor 262. Resistor 264 is connected in parallel across resistor 262 to correct for variations in the value of resistor 262 from the desired value, and may be omitted if such variations are not present. The $\cos \theta$ output from amplifier 76 is connected along path 271 to resistor 266, which is connected to the parallel combination of resistors 262 and 264 to provide the proper desired weighting constant for $\sin \phi$. For example, if $\phi$ is 22.5°, then a possible value for resistor 262 could be 51,000 ohms, and for resistor 266, 120,000 ohms. The interconnection of the resistors 270, 272 and 274 in the summing network 276 is similar to that of the summing network 268. Resistor 272 is connected in parallel across resistor 270 for the same purposes as resistor 264 and may be omitted if variations in the value of resistor 270 are not present, and resistor 274 is connected to the parallel combination of resistors 270 and 272. The $\cos \theta$ output along path 271 is connected in parallel to resistor 274 of network 276. The output of inverter 94, which is $-\sin \theta$, is connected along path 273 to resistor 270. By way of example, the values of resistors 270, 272 and 274 to provide the necessary weighting constant in this network for $\phi$ equal to 22.5° could be 123,120 ohms for the parallel combination of resistors 270 and 272, and 51,000 ohms for resistor 274.

The only difference in the structure of the weighted summing means 104 and 110 for pair 98, and 106 and 112 for pair 100 from that described with reference to pair 96, is in the values associated with the parameters in the respective summing networks 278 and 280 for pair 98, and 282 and 284 for pair 100, respectively so as to provide a different weighted sum for each pair 96, 98 and 100. Both the internal and external circuit connections of networks 268, 278 and 282 are identical, as are the connections of circuits 276, 280 and 284, with the purpose of resistors 288, 294, 300 and 306 in the respective networks 278, 280, 282 and 284 being identical with that of resistor 264, and may be omitted if the respective associated resistors 286, 292, 298 and 304 are the desired values. For the example chosen, where pair 98 is equivalent to $\phi$ equal to 45°, the value of the parallel combination of resistor 286 and 288 could be 68,000 ohms, and for resistor 290 68,000 ohms; and the value of parallel resistors 292 and 294 could be 68,000 ohms, and resistor 296 68,000 ohms. For pair 100, for the example chosen, where $\phi$ is equal to 67.5°, the value of paralleled resistors 298 and 300 could be 123,120 ohms, and for resistor 302, 51,000 ohms; and the value of paralleled resistor 304 and 306 could be 49,700 ohms, and for resistor 308, 120,000 ohms.

OPERATION

In order to understand the operation of the interferometer 12 of the present invention, we will first describe the obtaining of the sinusoidal signals $\sin \theta$ and $\cos \theta$, and then we will describe, in detail, the processing of these signals in the high resolution phase angle to pulse converter 66 to provide a high resolution output for the translation of the platform 20 along the measurement axis in the direction of arrow 16.

Obtaining of sin θ and cos θ signals

The laser light source 22 emits a narrow beam 318 which is split into two components 320 and 322 (FIG. 7) by the beam splitter 24. Beam 320 is directed towards stationary roof prism 26 where it is displaced and reflected back to a beam splitter 24 along parallel path 324. Beam 322 is incident on roof prism 28 which is translated along the light path between the beam splitter 24 and roof prism 28 so as to vary the length of the optical path between the beam splitter 24 and roof prism 28. Beam 322 strikes the reflective surface 40 of roof prism 28 and is directed toward reflective surface 42 where it is reflected along parallel path 326, which is displaced from path 322, to the beam splitter 24. Beams 326 and 324 are recombined at the beam splitter 24 in interference fields which are identical but displaced in phase, as shown by curves 48 and 50. These recombined beams 328 and 330 represent interference fields which correspond to the magnitude and direction of the displacement of the roof prism 28 along the light path between the beam splitter 24 and the roof prism 28 due to variations in the length of the light path. Each polarization component of the recombined beams 328 and 330 is intensity modulated by interference fringes. These fringes are equivalent to cyclic variations in the net intensity of the light at a point in the respective interference field, each variation being equivalent to a change in the position of roof prism 28 of λ, wherein λ is the wavelength of the laser source, which is in turn equivalent to the physical length of one cycle of a sinusoidal signal. The polarization components of the beams 328 and 330 are resolved into vertical and horizontal components and the resulting beams (not shown) strike the individual quadrants 55a and 55b, and 57a and 57b, respectively, of the two-element photocells 55 and 57 for the respective detection circuitry 30 and 32. A detector signal from each of the elements 55a, 55b, 57a and 57b includes an average D.C. current on which is superimposed an A.C. signal having a period corresponding to a reflector 28 displacement of λ/2. The A.C. signals from elements 55a and 57a are 180° out of phase with each other, and the A.C. signals from elements 55b and 57b are 90° out of phase with the A.C. signals from elements 55a and 57a. The photocurrents from the individual cells, or elements (FIG. 2), are converted to voltage signals by means of four load resistances 332, 334, 336 and 338. The D.C. levels from elements 55a and 57a may be rendered equal by filter 53, or by suitable choice of resistors 332 and 334, and similarly by resistors 336 and 338 for cells 55b and 57b. The outputs of photocells 55a and 57a are fed to the high gain differential amplifier 58, and the output of cells 55b and 57b are fed to the other high gain differential amplifier 60. Amplifier 58 subtracts the voltage across load resistor 334 from that across load resistor 332, and amplifier 60 subtracts the voltage across load resistor 338 from that across 336. These amplifiers 58 and 60 produce high level sine wave voltage signals in quadrature, one cycle corresponding to a fringe, each superimposed on a small fixed D.C. voltage which is due to circuit imperfections. The output of amplifier 58 is represented by sin θ, and the output of amplifier 60 is represented by cos θ. Where θ is the parameter $4\pi/\lambda$ d, where d is the displacement of prism 28. These signals are further amplified by amplifiers 72 and 76, respectively, which adjust the D.C. components to correct for these imperfections, and limit the system noise bandwidth. The outputs of amplifiers 72 and 76 are fed to Schmitt trigger circuits 80 and 82, respectively, which square these sine wave signals. In addition, the output of these amplifiers 72 and 76 is fed to appropriate weighted summing devices for the signal pairs 96, 98, and 100, and, in addition, the sin θ output of amplifier 72 is fed to inverter 94. In this manner, the appropriated weighted sums of the sin θ and cos θ inputs for high resolution are generated. The non-inverted output of Schmitt trigger 80 triggers multivibrator 190, and the complement of this output triggers multivibrator 194. The non-inverted output of Schmitt trigger 82 triggers multivibrator 192, and the complement of this output triggers multivibrator 196. The respective multivibrator that is triggered generates a short duration pulse, for example, 100 nanoseconds, the instant the associated Schmitt trigger switches state. These short duration pulses are combined with the Schmitt trigger signals in the condition responsive networks 214 through 220 inclusive, and 222 through 228 inclusive, in a manner to be described in greater detail hereinafter, to produce a pulse on either the up 240 or the down 252 line when reflector 28 moves a distance of λ/8 in either of those directions. In addition, the weighted sums present in the other pairs 96, 98 and 100, corresponding to phase displacements of 22.5°, 45°, and 67.5°, are processed in the same fashion as the sin θ and cos θ pair. The resulting pulses from these signal pairs 96, 98 and 100 are combined with the pulses from the original signal pair 95, to yield a digital signal on the appropriate line 138 and 146. These output lines 138 and 146 from gates 88 and 92 carry pulses which each represent a displacement of roof prism 28 of λ/32 due to interlacing of the input signals to gates 88 92. For a laser having a nominal wave length of 25 microinches, λ/32 is approximately 0.78 microinches. These up or down pulses are then passed to up-down counter circuitry 68 where they are counted and displayed on display device 70 as a measurement equivalent to the amount of translation relative to a reference point.

High Resolution Processing

Figure 4:
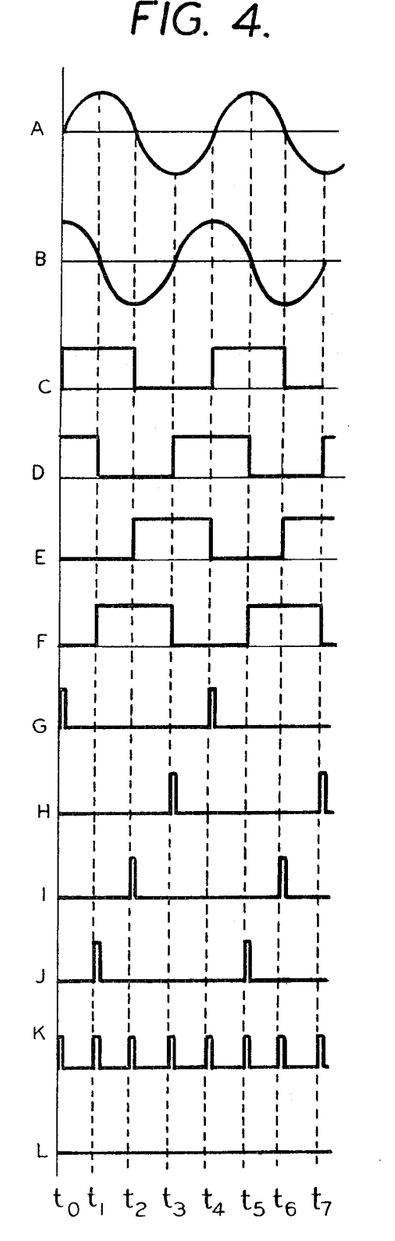
FIGS. 4 and 5 are timing diagrams illustrative of the operation of the circuit shown in FIGS. 3A, 3B and 3C.
Figure 5:
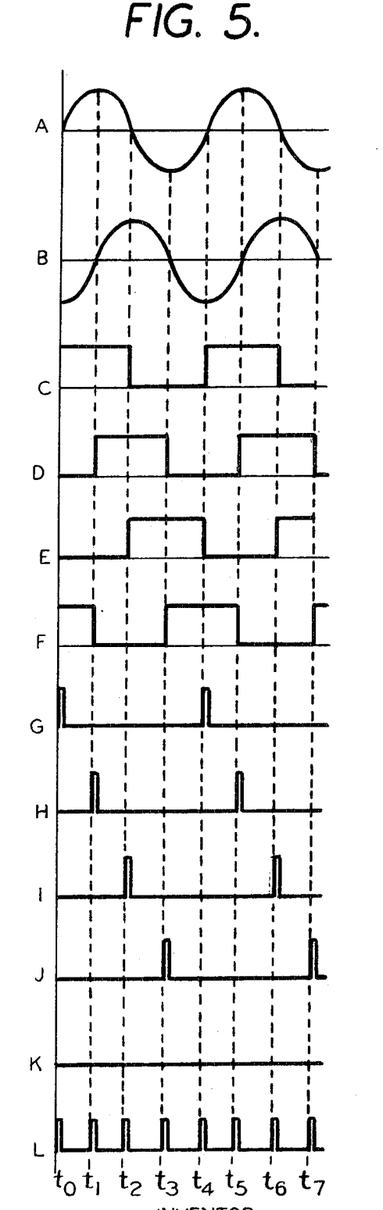

Referring now to FIGS. 3A, 3B and 3C, and the timing diagrams in FIGS. 5 and 5, I will now explain the operation of the high resolution circuitry. FIG. 4 represents a timing diagram for the signals present in the high resolution phase angle to pulse converter circuitry 66 during translation of the roof prism 28 along the light path between the beam splitter 24 and the roof prism 28, away from the beam splitter 24 in the direction which we have arbitrarily designated as causing up pulses. FIG. 5 represents the signals present in various portions of the high resolution phase angle to pulse converter circuitry 66 during translation of the roof prism 28 towards the beam splitter 24 in the opposite direction, which we have arbitrarily designated as causing down pulses. We will first describe the generation of up pulses with reference to FIG. 4, the waveforms of the various signals and operation of the circuitry being generally similar to that for the generation of down pulses except for some phase displacement of the respective sinusoids which are input to the respective Schmitt trigger and direction sensing circuitry and the resulting associated waveforms.

As was previously mentioned, the operation of the associated Schmitt trigger and direction sensing circuitry for the respective pairs 96, 98 and 100 of the original signal pair 95 is identical with respect to the signals input to the respective Schmitt triggers. The only difference is in the phase angle of the sinusoidal input signals; for signal pair 96 the phase angle difference being equal to 22.5°; for the signal pair 98, the phase angle difference being equal to 45°, and for the signal pair 100, the phase angle difference being equal to 67.5°. I will therefore describe in detail the operation of the Schmitt trigger and associated direction sensing circuitry with reference to the timing diagrams of FIGS. 4 and 5 for the original pair 95 of signals, by way of example.

Referring now to FIGS. 3A and 4, I will first discuss the operation of this circuitry to produce an up pulse. The sinusoid equivalent to sin θ, as shown by waveform A, is fed to base 162, of transistor 154 of the Schmitt trigger 80. The Schmitt trigger 80 squares this sinusoidal waveform to provide a square wave output through NAND gate 184, represented by waveform C. The Schmitt trigger 80 produces this squared waveform by switching state each time the input sinusoid changes sign. This output waveform C is also fed to NAND Gate 182 where it is inverted and produces a signal represented by waveform E. The output of NAND Gate 184 is fed to monostable multivibrator 190 which generates a short duration pulse each time the Schmitt trigger 80 goes from an OFF state to an ON state, which is equivalent to generating a pulse on the rising edge of waveform C; that is, when waveform C goes from a minimum value to a maximum value. The waveform produced thereby is represented by waveform G, which is the signal present on path 215. The output of NAND Gate 182 is fed to monostable multivibrator 194 which is triggered on the rising edge of waveform E to produce a short duration pulse each time Schmitt trigger 80 goes from an ON state to an OFF state. This is equivalent to triggering on the falling edge of waveform C. The output waveform produced from monostable multivibrator 194, which is the signal present on path 223, is represented by waveform I. As was previously discussed these signals are fed to the appropriate condition responsive AND gates 214 through 228, inclusive.

The sinusoid which is fed to Schmitt trigger 82, represented by waveform B which is a sinusoid which leads waveform A by 90 degrees, is applied to base 164 of transistor 168 of the trigger 82. As with the operation of the circuitry associated with Schmitt trigger 80, this waveform B is squared to produce a square wave, represented by waveform D, which is fed to NAND Gates 186 and 188, respectively. The output of NAND Gate 188, represented by waveform D, is fed to monostable multivibrator 192 which is triggered to generate a short duration pulse on the rising edge of the square wave pulses of waveform D to provide a signal on path 227, which is represented by waveform H. NAND Gate 186 inverts the input thereto, to produce a signal which is represented by waveform F, which is the inversion of waveform D. This signal is fed to monostable multivibrator 196 which generates a short duration pulse on the rising edge of this inverted waveform F, which is the equivalent to the generation of the pulse on the falling edge of waveform D. The waveform produced thereby is represented by waveform J which is the signal present on path 221. These signals are fed to the appropriate condition responsive NAND Gates 214 th ough 228, inclusive, in the manner previously discussed above. The waveforms G and D represent the inputs to AND Gate 214; waveform C and J represent the inputs to AND Gate 216; waveforms I and F represent the inputs to AND Gate 218; waveforms H and E represent the inputs to AND Gate 220; waveforms I and D represent the inputs to AND Gate 222; waveforms H and C represent the inputs to AND Gate 224; waveforms G and F represent the inputs to AND Gate 226; and waveforms J and E represent the inputs to AND Gate 228, to provide the various associated condition responsive output pulse signals. Preferably, in order for a particular AND Gate 214 through 228, inclusive, to provide an output pulse, both input signals must have a value corresponding to logic "1." The output of these AND Gates is fed to OR Gate 238 to provide an up pulse, and to OR Gate 250 to provide a down pulse. The conditions established by Gates 214 through 220 will only be met by the up pulse condition, as can be observed by reference to FIGS. 4 and 5. The output of OR Gate 238 is a pulse train constituted by up pulses, represented by waveform K. Since, for purposes of discussion, at this point we have only translated in the up pulse direction, the conditions of AND Gates 222 through 228, inclusive will not be met and they will provide no output pulses to OR 250 which will, therefore, produce no output signal at all, as represented by waveform L.

The operation of the Schmitt triggers 80 and 82, and their associated direction sensing logic is identical for the generation of the down pulses due to translation in the opposite direction, the only difference being that waveform B, which represents the cosine function now lags the sine function by 90°. The respective generated waveforms are shown in FIG. 5. In this case, the conditions of AND Gates 222 through 228 will be met so as to produce a pulse train from OR Gate 250 represented by waveform L of FIG. 5; and the conditions of AND Gates 214 through 220 will not be met and OR Gate 238, therefore, will produce no output as represented by waveform K of FIG. 5. The respective pulse trains are fed to the respective OR Gates 88 and 92. The respective pulses from the direction sensing circuitry 126, 128 and 130 of pairs 96, 98 and 100, respectively, are also fed to OR Gates 88 and 92. Each pair produces a pulse each equivalent to a displacement of λ/8 which, when combined in OR Gates 88 and 92, are interlaced pulses, which are each equivalent to a displacement of λ/32. These pulses are fed to the reversible up-down counter circuitry 68 which counts the occurrence of these pulses to provide a high resolution of the displacement of roof prism 28, and, thereby, of platform 20.

By utilizing the present invention, a high resolution interferometer capable of measuring displacements of an arbitrary fraction of a wavelength is provided. Furthermore, such an interferometer capable of having a movable reflector which may be translated normal to the direction of measurement, without interfering with the measurements of the interferometer, such as when used in a dual axis system wherein the movable reflectors are fixedly mounted to the platform which is to be moved in two directions, is provided.

It is to be understood that the above described embodiment of the invention is merely illustrative of the principles thereof and that numerous modifications and embodiments of the invention may be derived within the spirit and scope thereof.

What is claimed is:

1. In an optical interferometer having a source for producing a beam of monochromatic light; a first reflector; means for dividing said beam into first and second parts that are directed along respective paths, one of said paths intersecting said first reflector, said first reflector being oriented with respect to said dividing means to redirect one of said parts from the dividing means for recombination with the other part in an interference field, the improvement comprising,
   a second reflector, the other of said paths intersecting said second reflector, means for translating said second reflector with respect to said dividing means so as to have at least a component of translation substantially normal to the light path therebetween, said second reflector having first and second substantially planar reflective surfaces normal to each other, the intersection of said surface planes forming a roofline, said reflective surfaces being elongated in the component direction of translation substantially normal to said respective light path, and parallel to said roof line, said component direction of translation being parallel to said roof line said second reflector being oriented with respect to said dividing means to redirect said other of said parts from the dividing means for recombination with said one part in an interference field, one of said reflectors being translatable with respect to said dividing means along the light path therebetween whereby the translation of said one reflector along the respective light path produces cyclic variations in the net intensity of light at a point in said interference field.

2. An optical interferometer in accordance with claim 1 wherein said second reflector is translatable along the light path between said dividing means and said second reflector.

3. An optical interferometer in accordance with claim 2 wherein said second reflector is a roof prism.

4. An optical interferometer in accordance with claim 1 wherein said light source is a coherent light source.

5. An optical interferometer in accordance with claim 1 wherein said second reflector is a roof prism.

6. An optical interferometer in accordance with claim 1 wherein said first reflector is a roof prism.

7. An optical interferometer in accordance with claim 6 wherein said second reflector is a roof prism.

8. An optical interferometer in accordance with claim 1 wherein the improvement further comprises
   a means for determining the amount of translation of said one reflector along said respective light path from the cyclic variations, said determining means including means for providing a first pair of interference signals having a sinusoidal cyclic variation corresponding to the cyclic variation in intensity of light at said point in the interference field that results solely from the translation of the one reflector along the respective light path, said first pair of sinusoidal interference signals being displaced in phase from each other;

means responsive to said first pair of signals for providing a digital signal related to the translation of said one reflector along said light path, said digital signal providing means including weighted summing means operatively connected to said first signal pair providing means, said weighted summing means including means for providing a second pair of sinusoidal signals from said first signal pair which is a weighted sum of said first signal pair, and sensing means for providing said digital signal from both said first and second signal pairs in accordance with a predetermined signal pair condition.

9. An optical interferometer in accordance with claim 8 wherein said second reflector is a roof prism.

10. An optical interferometer in accordance with claim 8 further comprising:

said dividing means which provides another interference field from recombination which is directed along a separate path from said first interference field;

means for producing first and second electrical signals of magnitudes that correspond to the light intensity at said point in said first interference field and a respective point in said other interference field, respectively;

means responsive to said electrical signals for providing first and second interference signals respectively, each having a cyclic variation in intensity of light at the point in said respective interference field that results solely from the translation of the one reflector along the respective light path, said first and second interference signals having an average D.C. level; and means for combining the first and second interference signals to provide an interference signal having an average D.C. level of substantially less than the magnitude of the cyclic signal fluctuations.

11. In an optical interfometer having a source for producing a beam of monochromatic light; a first reflector; means for dividing said beam into first and second parts that are directed along respective paths, one of said paths intersection said first reflector, said first reflector being oriented with respect to said dividing means to redirect one of said parts from the dividing means for recombination with the other part in an interference field; a second reflector, the other of said paths intersecting said second reflector, said second reflector being translatable with respect to said dividing means along the light path therebetween and being oriented with respect to said dividing means to redirect said other of said parts from the dividing means for recombination with said one part in an interference field, whereby the translation of said second reflector produces cyclic variations in the net intensity of light at a point in said interference field, the improvement comprising:

a means for determining the amount of translation of said second reflector along said respective light path from the cyclic variations, said determining means including means for providing a first pair of interference signals having a sinusoidal cyclic variation corresponding to the cyclic variation in intensity of light at said point in the interference field that results solely from the translation of the second reflector along the respective light path, said first pair of sinusoidal interference signals being displaced in phase from each other;

means responsive to said first pair of signals for providing a digital signal related to the translation of said second reflector along said light path, said digital signal providing means including weighted summing means operatively connected to said first signal pair providing means, said weighted summing means including means for providing a second pair of sinusoidal signals from said first signal pair which is a weighted sum of said first signal pair; and direction sensing means for providing said digital signal from both said first and second signal pairs in accordance with a predetermined signal pair condition.

12. An optical interferometer in accordance with claim 11 further comprising means responsive to said digital signal to provide a display of the amount of translation of the second reflector along the light path with respect to a reference point.

13. An optical interferometer in accordance with claim 11 wherein said light source is a coherent light source.

14. An optical interferometer in accordance with claim 11 wherein said weighted summing means further includes means for providing a third pair of sinusoidal signals which is a different weighted sum of said first signal pair than said second signal pair.

15. An optical interferometer in accordance with claim 14 wherein said sensing means includes means for providing said digital signal from all of said signal pairs.

16. An optical interferometer in accordance with claim 14 wherein said respective signals of each pair have the same phase displacement with respect to each other.

17. An optical interferometer in accordance with claim 11 wherein said first signal pair is represented by the expressions $\cos\theta$ and $\sin\theta$, each of said signals of said second signal pair is a different weighted sum of said first signal pair, the first weighted sum being represented by the expression $\sin(\theta+\phi) = \sin\theta\cos\phi + \cos\theta\sin\phi$, and the other weighted sum being represented by the expression $\cos(\theta+\phi) = \cos\theta\cos\phi - \sin\theta\sin\phi$, where $\phi$ is an arbitrary predetermined phase angle, and $\cos\phi$ and $\sin\phi$ are weighting constants.

18. An optical interferometer in accordance with claim 11 wherein said sensing means includes means responsive to said predetermined condition of a signal pair.

19. An apparatus in accordance with claim 18 wherein said condition responsive means includes means for providing a pulse signal each time a predetermined condition occurs for a signal of said condition providing pair, and means for combining said pulse signal and said other signal of said condition providing pair, said combining means including a first means responsive to a first set of logic combinations of said pulse signal with said other signal to provide an output pulse corresponding to translation in a given direction.

20. An apparatus in accordance with claim 19 wherein said combining means includes a second means responsive to a second set of logic combinations of said pulse signal with said other signal to provide another output pulse corresponding to translation in the opposite direction.

21. An optical interferometer in accordance with claim 18 wherein said condition includes a crossing of the midpoint in the magnitude of said cyclic variation of one signal of said condition providing pair.

22. An optical interferometer in accordance with claim 21 wherein said condition responsive means is responsive to the location of the other signal of said pair with respect to the midpoint in the magnitude of said cyclic variation of said signal when the crossing condition occurs for said one signal of said condition providing pair.

23. An optical interferometer in accordance with claim 21 wherein said means for providing said digital signal from said signal pairs includes bistable means for squaring the sinusoidal signals in said condition providing pair, said respective square signals having the same frequency as said respective sinusoidal signals.

24. An optical interferometer in accordance with claim 21 wherein said condition responsive means provides an output pulse when the crossing condition occurs for the one signal of the condition providing pair in combination with the occurrence of the location condition for the other signal of the condition providing pair.

25. An optical interferometer in accordance with claim 23 wherein said bistable squaring means comprises a Schmitt trigger, the D.C. component of the sinusoidal signals of the condition providing signal pair corresponding to the switching level of the Schmitt trigger.

26. An optical interferometer in accordance with claim 23 wherein said bistable squaring means comprises a bistable trigger for each signal of said condition providing pair, each of said bistable triggers providing a cardinal pulse as said square signal corresponding to the location condition; and said condition responsive means includes a monostable means to provide a pulse in response to a change of state in the respective bistable trigger corresponding to the crossing condition, and combining means responsive to the presence of both said cardinal pulse and said monostable pulse for providing said output pulse.

27. An optical interferometer in accordance with claim 26 wherein said sensing means includes inverter means operatively associated with one of said bistable triggers for providing the complement of said trigger output signal in addition to said uninverted output signal; said monostable means being associated with said inverter for additionally providing a pulse in response to a change in state in said inverted output corresponding to an opposite change in state in said uninverted output to said combining means; and a means for providing inverted pulses from said monostable pulses to said combining means, said combining means being responsive to a first set of logic combinations of said pulse signals to provide an output pulse corresponding to the translation of the second reflector along the respective light path in one direction.

28. An optical interferometer in accordance with claim 27 wherein the interference signal pair providing means provides a pair of sinusoidal interference signals for one direction of translation of the second reflector along the respective light path, said interference signals being displaced 180 degrees from the phase displacement of the first pair of signals for the opposite direction of translation along the path; and said combining means includes a first means responsive to the first set of logic combinations of said pulse signals for providing an output pulse corresponding to translation in said one direction; and a second means responsive to a second set of logic combinations of said pulse signals for the opposite direction of translation of the second reflector along the respective light path to provide another output pulse corresponding to translation in the opposite direction.

29. An optical interferometer in accordance with claim 11 wherein said second pair providing means includes an operational amplifier means having an associated impedance network, said operational amplifier network providing the weighted sum of said first sinusoidal signal pair as said second sinusoidal signal pair.

30. An optical interferometer in accordance with claim 29 wherein said operational amplifier means comprises an operational amplifier and associated impedance network for each signal of the second signal pair, the respective operational amplifier network providing a weighted sum from the first signal pair for each of the signals of the second signal pair.

31. An optical interferometer in accordance with claim 11 wherein said means for providing a first pair of interference signals includes:

photoelectric means for producing a first pair of signals of a magnitude that corresponds to the light intensity at said point; and means responsive to said photoelectric produced signal pair.

32. An optical interferometer in accordance with claim 11 wherein said sensing means includes means responsive to a predetermined condition of each signal pair for providing a pulse signal for each signal pair in accordance with the occurrence of said condition; and combining means operatively associated with said responsive means and said respective pulse signals for providing an interlaced output signal from said respective pulse signals having a period which is less than the periods of the respective pulse signals.

33. In an optical interferometer having a source for producing a beam of monochromatic light; a first reflector; means for dividing said beam into first and second parts that are directed along respective paths, one of said paths intersecting said first reflector, said first reflector being oriented with respect to said dividing means to redirect one of said parts from the dividing means for recombination with the other part in an interference field; a second reflector, the other of said paths intersecting said second reflector, said second reflector being translatable with respect to said dividing means along the light path therebetween and being oriented with respect to said dividing means to redirect said other of said parts from the dividing means for recombination with said one part in an interference field, whereby the translation of said second reflector produces cyclic variations in the net intensity of light at a point in said interference field, the improvement comprising:

said dividing means which provides another interference field from recombination which is directed along a separate path from said first interference field;

means for producing first and second electrical signals of magnitudes that correspond to the light intensity at said point in said first interference field and a respective point in said other interference field, respectively, said first and second electrical signals comprising first and second interference signals, respectively, each having a cyclic variation in intensity of light at the point in said respective interference field that results solely from the translation of the second reflector along the respective light path, said first and second interference signals having an average D.C. level, said cyclic variations being substantially 180° out of phase and means for combining the first and second interference signals to provide an interference signal having an average D.C. level of substantially less than the magnitude of the cyclical signal fluctuations.

34. An optical interferometer in accordance with claim 33 wherein the combining means includes means for providing an interference signal having average D.C. level of 0 volts.

35. An optical interferometer in accordance with claim 33 wherein:

said electrical signal producing means comprises a first photoelectric means for producing the first electric signal; and a second photoelectric means for producing the second electrical signal.

* * * * *